T. E. BROWN & C. T. WESTLIN.
MACHINE FOR USE IN GATHERING COTTON.
APPLICATION FILED MAR. 12, 1914.
1,230,374.
Patented June 19, 1917.
3 SHEETS—SHEET 1.
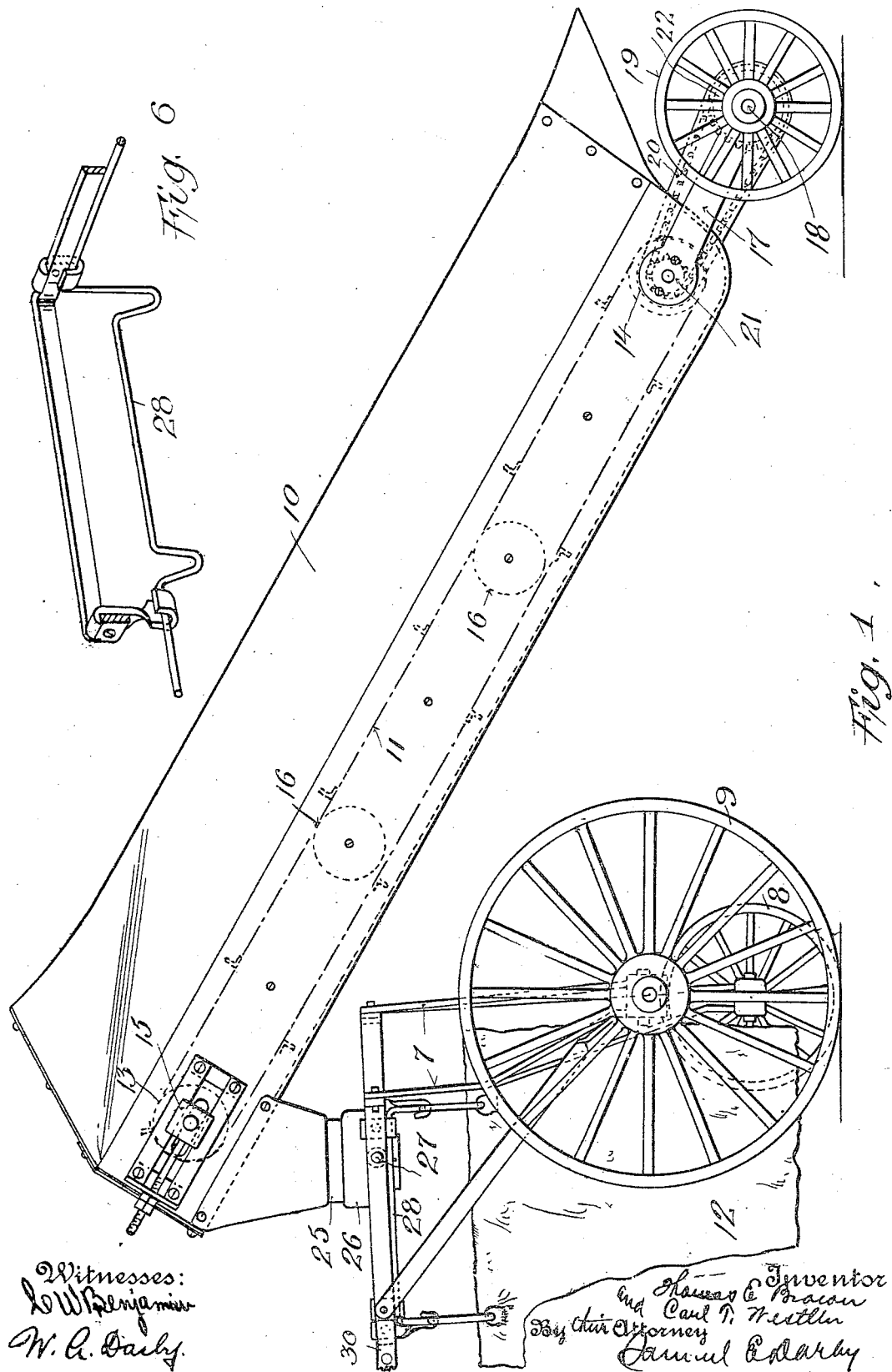

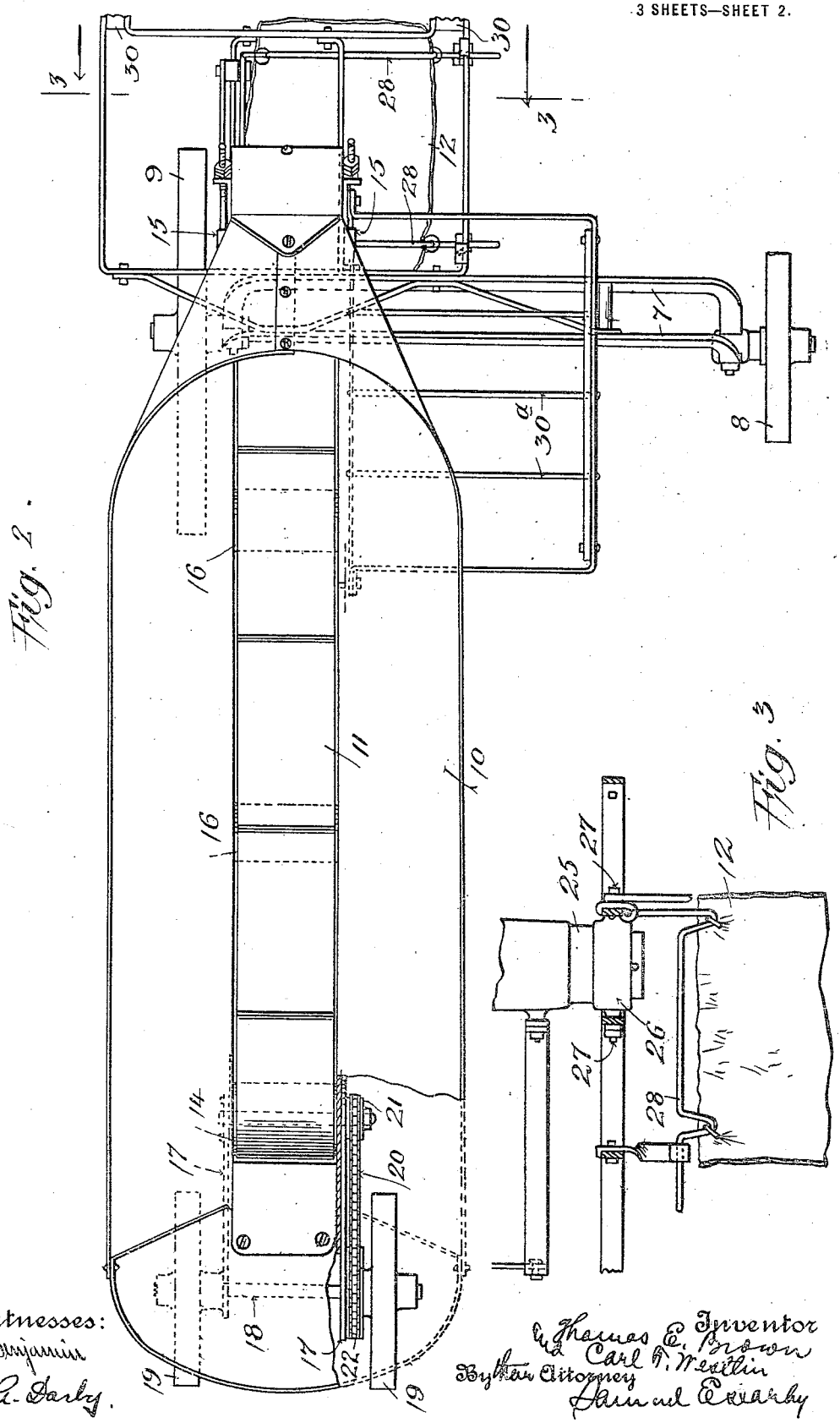

T. E. BROWN & C. T. WESTLIN.
MACHINE FOR USE IN GATHERING COTTON.
APPLICATION FILED MAR. 12, 1914.

1,230,374.

Patented June 19, 1917.

UNITED STATES PATENT OFFICE.

THOMAS E. BROWN, OF NEW YORK, N. Y., AND CARL T. WESTLIN, OF ARLINGTON, NEW JERSEY, ASSIGNORS TO COTTON MACHINERY COMPANY, OF NEW YORK, N. Y., A CORPORATION OF NEW YORK.

MACHINE FOR USE IN GATHERING COTTON.

1,230,374.      Specification of Letters Patent.      Patented June 19, 1917.

Application filed March 12, 1914. Serial No. 824,330.

*To all whom it may concern:*

Be it known that we, THOMAS E. BROWN, a citizen of the United States, residing at New York, in the county of New York and State of New York, and CARL T. WESTLIN, a subject of the King of Sweden, residing at Arlington, county of Hudson, State of New Jersey, have made a certain new and useful Invention in Machines for Use in Gathering Cotton, of which the following is a specification.

This invention relates to machine for use in gathering cotton, and particularly to machines of the type employing a trailing receptacle into which the cotton as picked by the hands of laborers is thrown, and in which receptacle operates a conveyer to deliver the gathered cotton into suitable bags, baskets or the like.

The object of the invention is to simplify and improve the construction of machines of this type and nature.

A further object is to provide a novel arrangement for actuating the carrier which operates in the trailing receptacle.

A further object is to provide a novel arrangement for mounting and supporting the trailing receptacle.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

Referring to the drawings, and to the various views and reference numerals appearing thereon,—

Figure 1 is a view in side elevation of a machine for use in gathering cotton constructed in accordance with and embodying the principles of our invention.

Fig. 2 is a top plan view of the same.

Fig. 3 is a broken view in vertical transverse section on the line 3, 3, Fig. 2, looking in the direction of the arrows.

Fig. 6 is a detached broken detail view showing a portion of the means employed for supporting a bag in position to receive the picked cotton as delivered from the receiving receptacle.

The same part is designated by the same reference numeral wherever it occurs throughout the several views.

Figure 5:
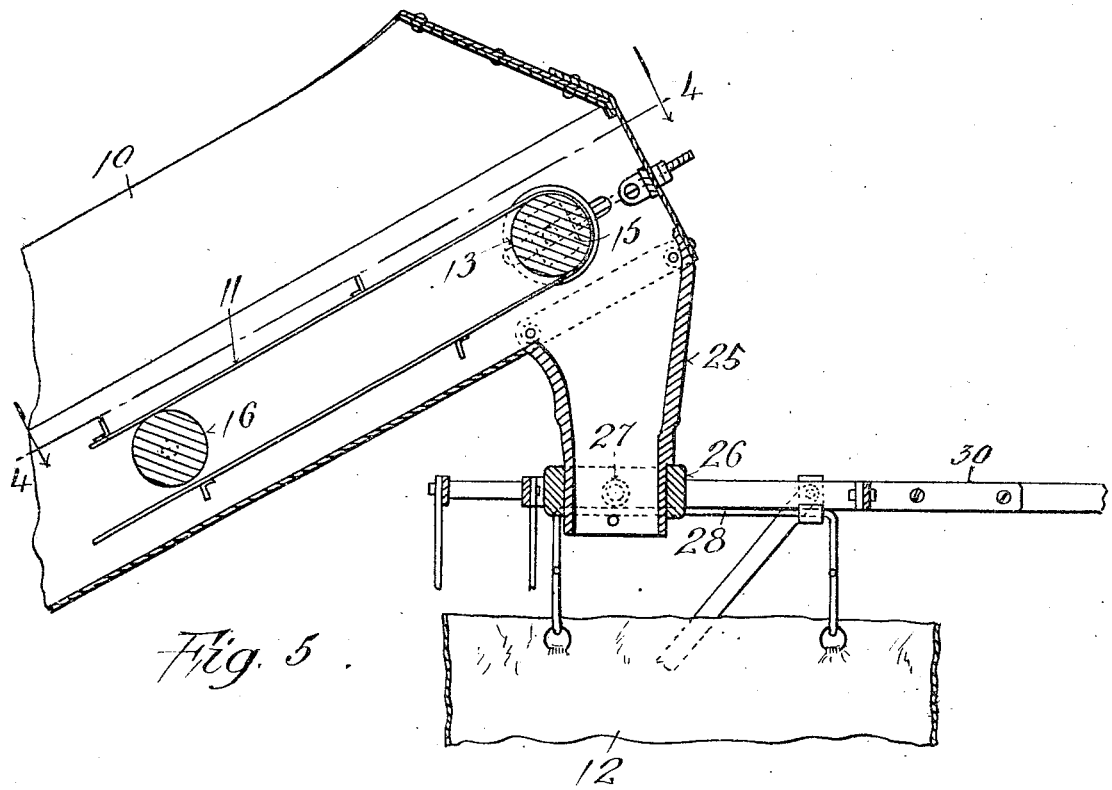
Fig. 5 is a similar view in vertical longitudinal section on the line 5, 5, Fig. 4, looking in the direction of the arrows.
Figure 4:
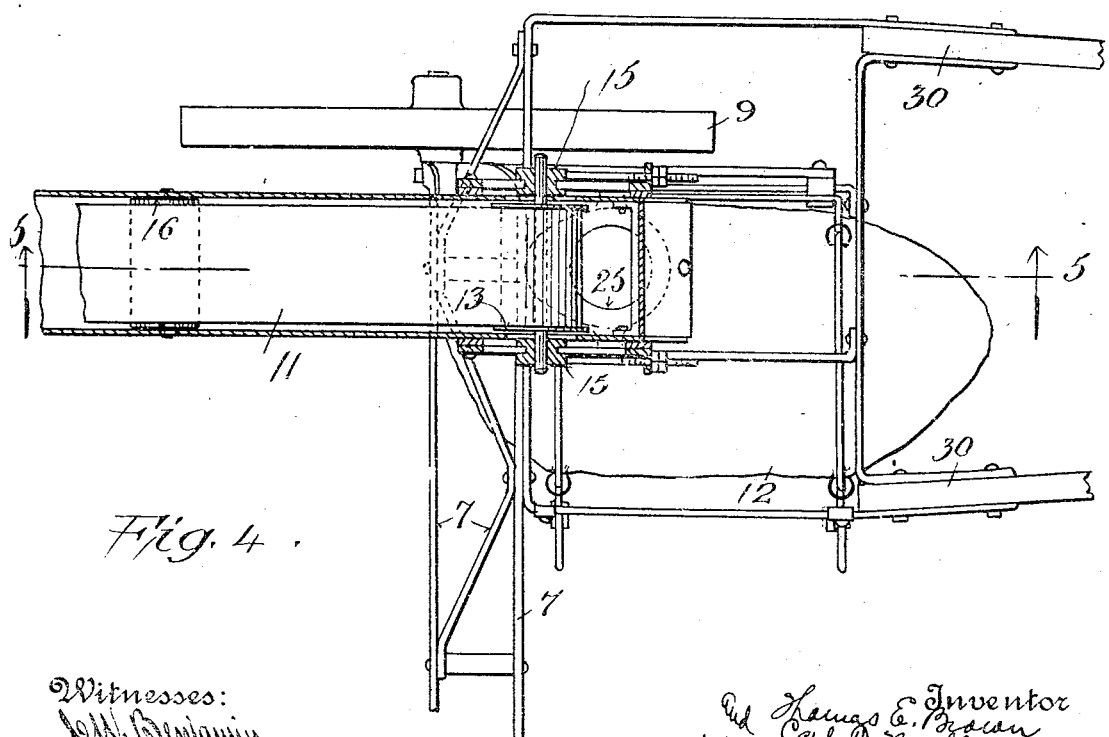
Fig. 4 is a broken detail view in top plan, parts in longitudinal section on the line 4, 4, Fig. 5, looking in the direction of the arrows.

In our Patent No. 1,103,653, dated July 14, 1914, we have shown, described and claimed a type and construction of machine for use in harvesting cotton wherein a frame is provided with side supporting wheels at the ends thereof and is raised or arched intermediate its ends, one of the supporting wheels being of smaller diameter than the other, and a receptacle which is open at its top for at least the greater portion of its length is supported at its forward end upon the raised or arched portion of the frame and is inclined rearwardly and downwardly toward the ground therefrom, a carrier or conveyer being arranged in the bottom of the receptacle and actuated by the drive gearing connections to the larger one of the supporting wheels. In the type of machine set forth in said application the supporting wheels are spaced apart from each other a distance sufficient to enable the machine to straddle or span a single row of cotton stalks, the trailing receptacle being positioned to one side of the frame and in proximate relation to the vertical plane of the large supporting wheel. The present invention relates to a machine of the general type and resides specifically in certain details of structure and arrangement.

In the drawings 7, designates the frame, which is supported at its ends upon the side wheels 8, 9, the wheel 9 being of larger diameter than the wheel 8, and spaced apart therefrom a sufficient distance to enable them to span a single row of cotton stalks. The frame 7 is raised or arched intermediate its ends. The receptacle 10, is open at its top and is connected at its forward end to the frame and trails rearwardly in downwardly inclined position therefrom, said receptacle, as shown, being positioned at one side of the frame to extend approximately in the vertical plane of operation of the larger wheel 9. A carrier 11 is arranged to operate in said receptacle and forms a movable bottom therefor, said carrier delivering to the upper end of the receptacle and thence into a suitable bag, basket or the like, 12, positioned below the delivery mouth of the receptacle.

The carrier 11 operates over rolls 13, 14, respectively located at the forward and rear ends of the receptacle, the roll 13, being carried in adjustable bearings 15 to permit the tension of the carrier to be adjusted. Idler guide rolls 16, may be employed in the receptacle over which the carrier operates.

The parts so far described may, in general be the same as shown described and claimed in our patent above referred to.

In the machine of our above mentioned patent the receptacle is carried and wholly supported by the raised or arched portion of the frame. This requires a heavy structure of frame to carry the weight of the receptacle, and it is among the purposes of our present invention to reduce the weight of the frame by merely supporting the upper forward end of the receptacle on the machine frame and to support the rear lower end of the receptacle upon the ground. In the particular arrangement shown as embodying the principles of our invention, but to which we do not desire to be limited or restricted, we provide the lower rear end of the receptacle with rearwardly extending side arms 17, in the rear ends of which is carried a shaft 18, on which are mounted the wheels 19, the latter resting and operating along the surface of the ground, and forming supports for the lower end of the receptacle. By thus distributing the weight of the receptacle partly on the wheels 19 and partly on the machine frame, we are enabled to make the latter lighter than could be done otherwise. We also propose in accordance with our present invention to drive the carrier 11 from the supporting wheels 19 for the lower end of the receptacle. To accomplish this we make the roll 14 at the lower end of the receptacle the driver for the carrier 11, and we gear the shaft thereof to the shaft 18 of the wheels 19. A simple arrangement is shown wherein a sprocket chain 20 operates over gears 21, 22, respectively mounted upon the shaft of roll 14 and the shaft 18.

By reason of the wheels 19 encountering stones, obstructing ridges or other form of rough places in the ground surface over which they operate, it is desirable to so mount the forward upper end of the receptacle 10 as to permit a desirable range of vertical as well as lateral movement thereof. To accomplish this result we provide the upper end of the receptacle with a depending funnel chute 25, which is seated vertically in a ring bearing 26 for rocking movement about the vertical geometric axial line of said chute and ring so as to permit a desirable range of lateral or sidewise rocking movement of the receptacle. The bearing ring 26 is itself pivotally mounted in the frame, as indicated at 27, upon a horizontal axis which intersects the vertical axis of the ring and chute. With this arrangement the receptacle is also permitted to rock or tilt vertically as the supporting wheels for the lower end thereof ride over rough or uneven places. The tubular swivel chute 25, is secured to the under side of the receptacle at its upper end and immediately below the delivery end of the carrier 11, and constitutes not only a swivel support for the receptacle but also a delivery chute from the receptacle. Positioned immediately below the lower end of the tubular swivel chute 25 is the bag basket or the like 12, into which the said chute delivers, said bag or basket being conveniently supported detachably upon arms 28, so that when a bag is filled it may be removed and replaced by an empty bag.

A rack 30$^a$ may be supported upon the frame 7 for the purpose of carrying empty bags, baskets or the like.

The machine may be progressed through the field in any suitable or convenient manner. In the particular arrangement shown we provide draft appliances 30, for attachment of a horse or mule to the machine to draw the same along or through the field.

It will be understood that many variations and changes in the details of construction and arrangement of parts would readily occur to persons skilled in the art and still fall within the spirit and scope of our invention. We do not desire, therefore, to limit or restrict ourselves to the exact details shown and described.

But, having set forth the objects and nature of our invention and a construction embodying the principles thereof, what we claim as new and useful and of our own invention and desire to secure by Letters Patent of the United States is—

1. In a machine for use in gathering cotton, a supporting frame, a receptacle having a tubular chute depending from its forward end, a support mounted on wheels and in which said chute is vertically journaled for swivel movement about a vertical axis, the receptacle being inclined rearwardly and downwardly from said support, means for supporting the other end of the receptacle on the ground, and a carrier operating in said receptacle.

2. In a machine for use in gathering cotton, a support mounted on wheels, a bearing ring pivotally mounted therein upon a horizontal axis, a receptacle having a tubular chute vertically journaled in said bearing ring for horizontal swiveling movement about a vertical axis, said receptacle being inclined rearwardly and downwardly from said support and resting at its lower end upon the ground, a carrier operating in said receptacle and means for operating said carrier.

3. In a machine for use in gathering cotton, a supporting frame mounted upon wheels, a receptacle having a tubular delivery chute depending from the forward end thereof a horizontally pivoted bearing in which said chute is swivelly journaled vertically to allow vertical and horizontal movement, said receptacle extending downwardly and rearwardly from said frame, means to support the lower rear end of said receptacle on the ground, and a carrier operating in said receptacle.

In testimony whereof we have hereunto set our hands in the presence of the subscribing witnesses, on this 9th day of March, A. D. 1914.

THOMAS E. BROWN.
CARL T. WESTLIN.

Witnesses:
SAMUEL G. DARBY, Jr.,
CLINTON B. BROWN.